United States Patent [19]

McHugh

[11] Patent Number: 5,297,635

[45] Date of Patent: * Mar. 29, 1994

[54] COMBINED ALARM AND BACK-FLOW PREVENTION ARRANGEMENT FOR FIRE SUPPRESSION SPRINKLER SYSTEM

[75] Inventor: George J. McHugh, Broomall, Pa.

[73] Assignee: Back-Flo Alarm Valve Co., Inc., West Chester, Pa.

[*] Notice: The portion of the term of this patent subsequent to Oct. 13, 2009 has been disclaimed.

[21] Appl. No.: 811,291

[22] Filed: Dec. 20, 1991

Related U.S. Application Data

[63] Continuation-in-part of Ser. No. 733,203, Jul. 19, 1991, Pat. No. 5,154,232, which is a continuation of Ser. No. 571,406, Aug. 23, 1990, abandoned, which is a continuation of Ser. No. 335,381, Apr. 10, 1989, Pat. No. 4,991,655, which is a continuation-in-part of Ser. No. 269,314, Nov. 10, 1988, abandoned, which is a continuation-in-part of Ser. No. 250,834, Sep. 29, 1988, abandoned, which is a continuation-in-part of Ser. No. 247,073, Sep. 21, 1988, abandoned.

[51] Int. Cl.$^5$ .............................................. G08B 17/04
[52] U.S. Cl. ......................................... 169/23; 169/16
[58] Field of Search ................ 169/5, 23, 16; 137/599

[56] References Cited

U.S. PATENT DOCUMENTS

| 857,321 | 6/1907 | Waltz | 251/83 X |
|---|---|---|---|
| 988,768 | 4/1911 | Goldstein | 169/23 X |
| 1,026,439 | 5/1912 | Hamilton | 169/23 |
| 1,125,407 | 1/1915 | Shipman | 169/23 |
| 1,414,723 | 5/1922 | Brumbaugh | 169/23 |
| 1,428,645 | 9/1922 | McDonnell | 169/23 X |
| 1,869,202 | 7/1932 | Lowe et al. | |
| 1,950,029 | 3/1934 | Hamilton et al. | 169/17 |
| 1,958,143 | 5/1934 | Howard | 169/23 |
| 2,017,841 | 10/1935 | Coleman | 169/16 |
| 2,505,761 | 5/1950 | Gieseler | 169/16 |
| 2,558,175 | 6/1951 | Gieseler | 169/5 |
| 2,646,064 | 7/1953 | Colton | 137/107 X |
| 3,837,358 | 9/1974 | Zieg et al. | 137/218 X |
| 3,888,314 | 6/1975 | Landsberg | 169/20 |
| 3,958,643 | 5/1976 | Landsberg | 169/43 |
| 4,287,905 | 9/1981 | Iglesias | 137/102 |
| 4,337,655 | 7/1982 | Sundstrom et al. | 73/861.77 X |
| 4,361,189 | 11/1989 | Adams | 169/14 |
| 4,489,746 | 12/1984 | Daghe et al. | 137/218 |
| 4,991,655 | 2/1991 | McHugh | 169/5 X |
| 5,154,232 | 10/1992 | McHugh | 169/23 |

FOREIGN PATENT DOCUMENTS

| 32049 | 2/1934 | Netherlands | 169/5 |
|---|---|---|---|
| 321085 | 10/1929 | United Kingdom | 169/16 |
| 999071 | 7/1965 | United Kingdom | |

OTHER PUBLICATIONS

"Sprinkler System Guide", The Viking Corporation, Nov. 1974.
"The Viking Corporation Sprinkler Systems Catalog", Apr. 1985.
"Wilkins Backflow Preventers", Zurn Industries, Inc. Brochure.
Lawler ITT Instruction Manual, Bulletin No. BF-10 Backflow Preventers, 1977.
Watts Regulator Brochure, S-FT-TK-9A-8.
(List continued on next page.)

Primary Examiner—David M. Mitchell
Assistant Examiner—Gary C. Hoge
Attorney, Agent, or Firm—Burns, Doane, Swecker & Mathis

[57] ABSTRACT

A backflow prevention and flow detection arrangement is provided by a first and a second check valve with a passageway provided between the check valves. The second check valve may be an alarm valve with an alarm which is sounded when the alarm valve is open. Bypass meter piping is provided to record a flow through the main conduit with the bypass meter piping having a check valve to maintain the integrity of the backflow preventer. Preferably, an inlet of the bypass meter piping is providing in fluid communication with the main conduit between the first and second check valves.

19 Claims, 11 Drawing Sheets

OTHER PUBLICATIONS

Watts Regulator Brochure, ES-709L-4.
Watts Regulator Brochre RP/IS-909-8.
Watts Regulator Borchure, ES-909-3.
Watts Regulator Brochure, ES-AG-909-1.
Watts Regulator Brochure, ES-909L-9.
Watts Regulator Brochure C-BPD-7 Backflow Prevention Devices.
Watts Regulator Brochure C-BPD-10 Backflow Prevention Devices.
NIBCO Brochure; p. 52, "Class 250 iron body automatic stop check".
NIBCO Brochure, p. 53, "Sizing the automatic stop-check F-869".
Data Industrial Advertisement, "Your best case for impeller flow sensors".
Ames Co. Brochure for valves and backflow assemblies, "Model 5000 RPDA".
Crane Catalog, pp. 301-308, "Ferrosteel and Cast Steel Stop-Check Valves", and Ferrosteel and Cast Steel Blow-Off Valves.
Empire Specialty Co., Inc. Catalog for general automatic valves.

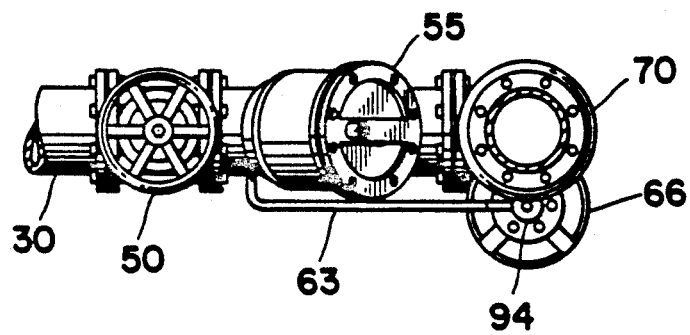
Fig. 4
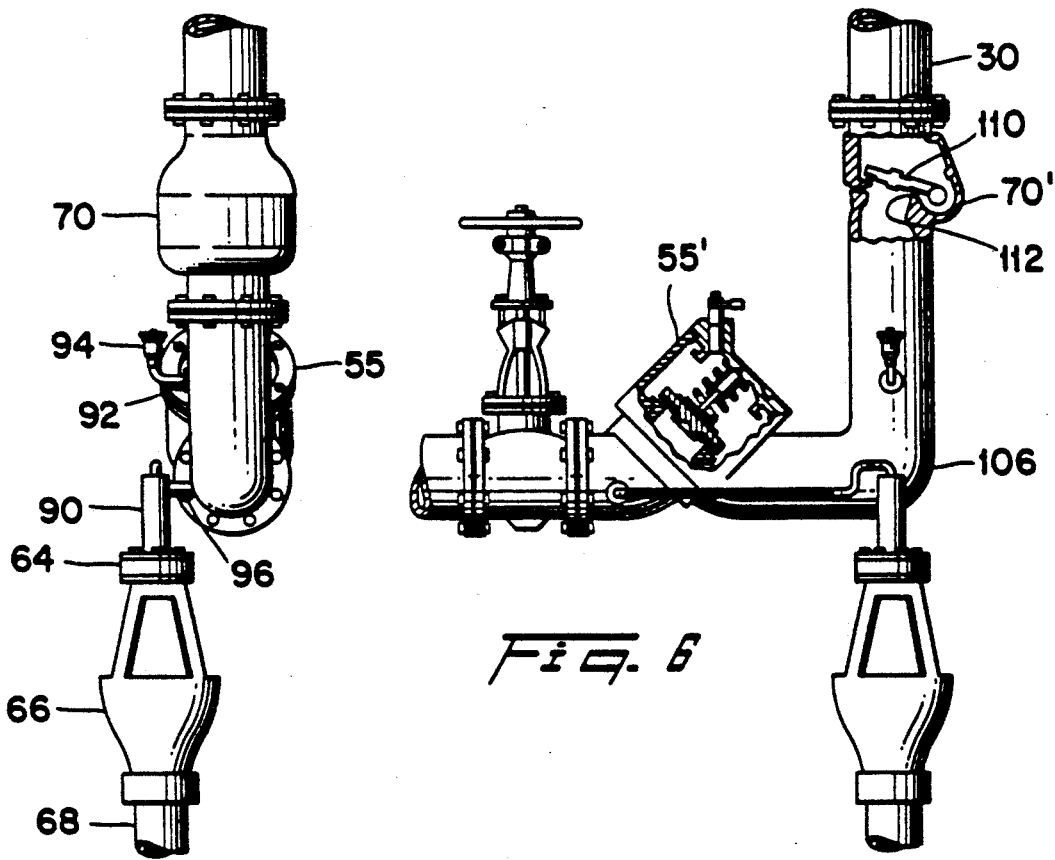
Fig. 5
Fig. 6

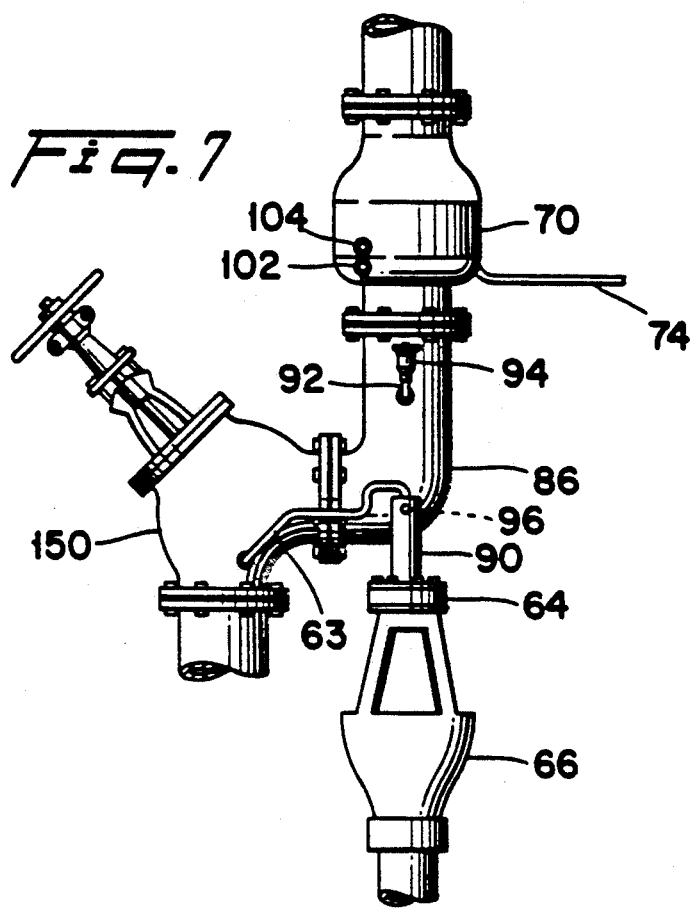
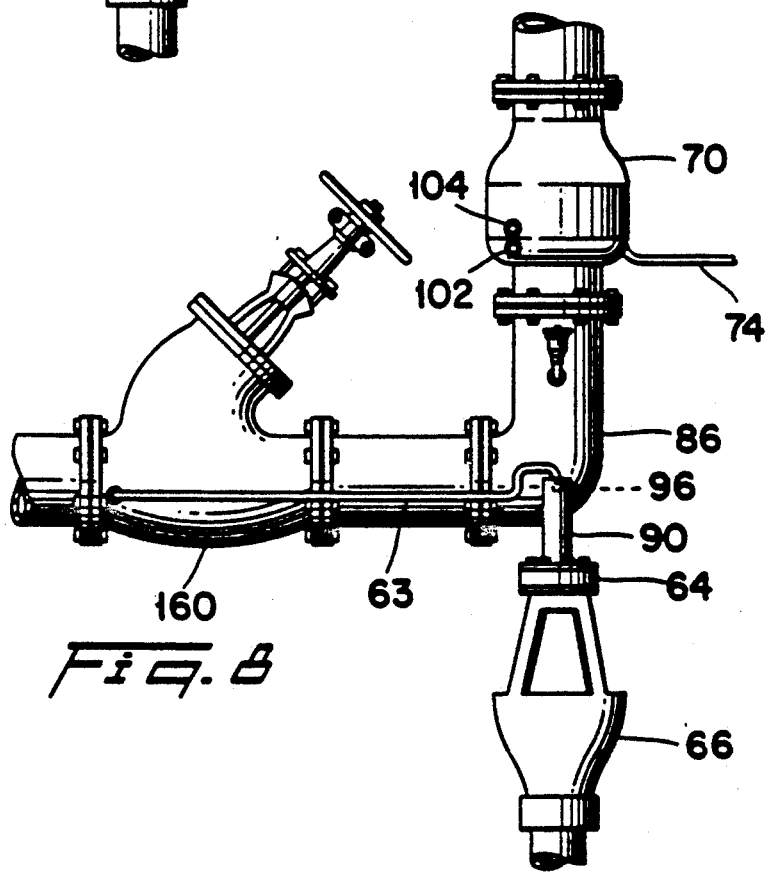

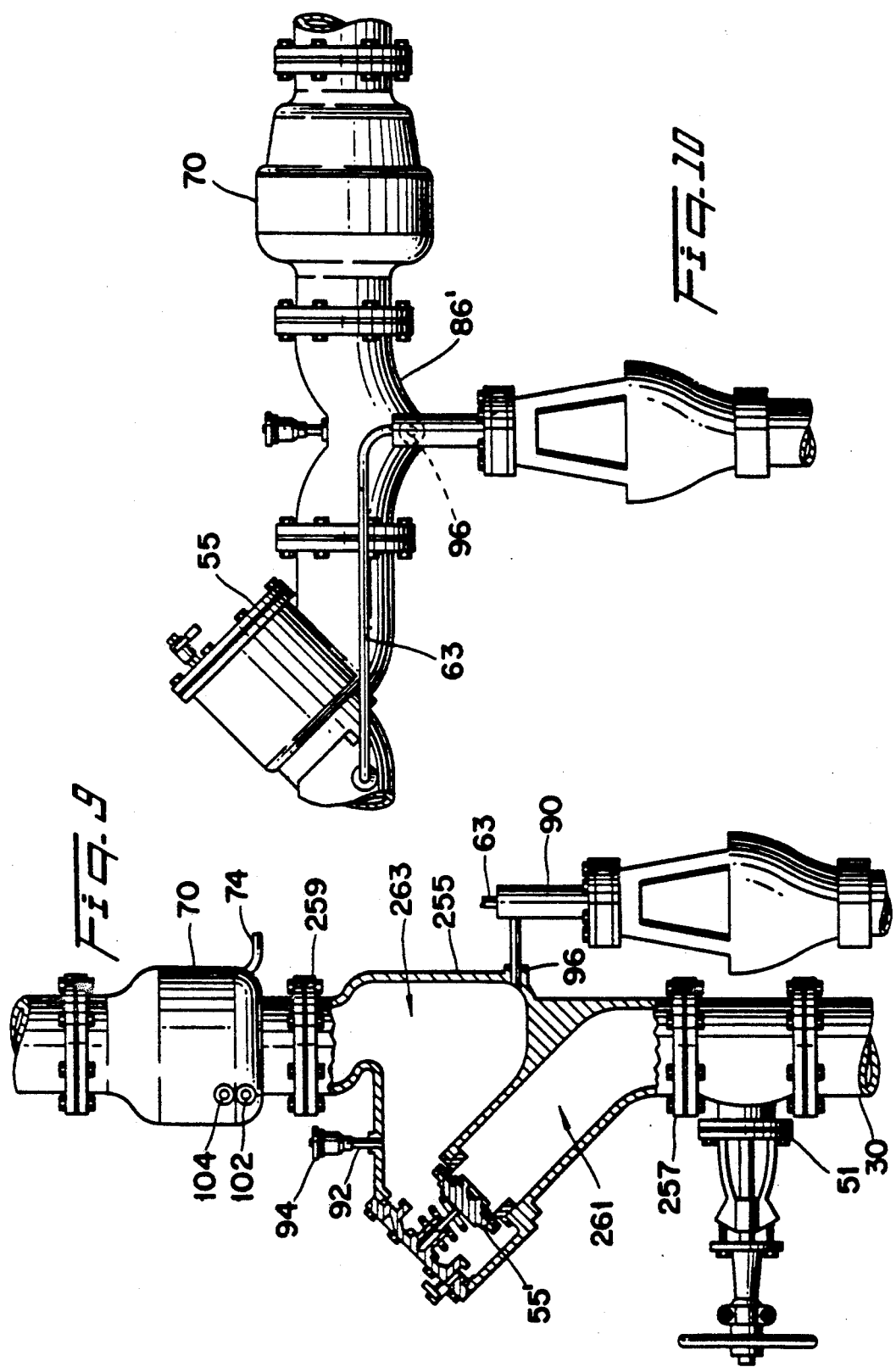

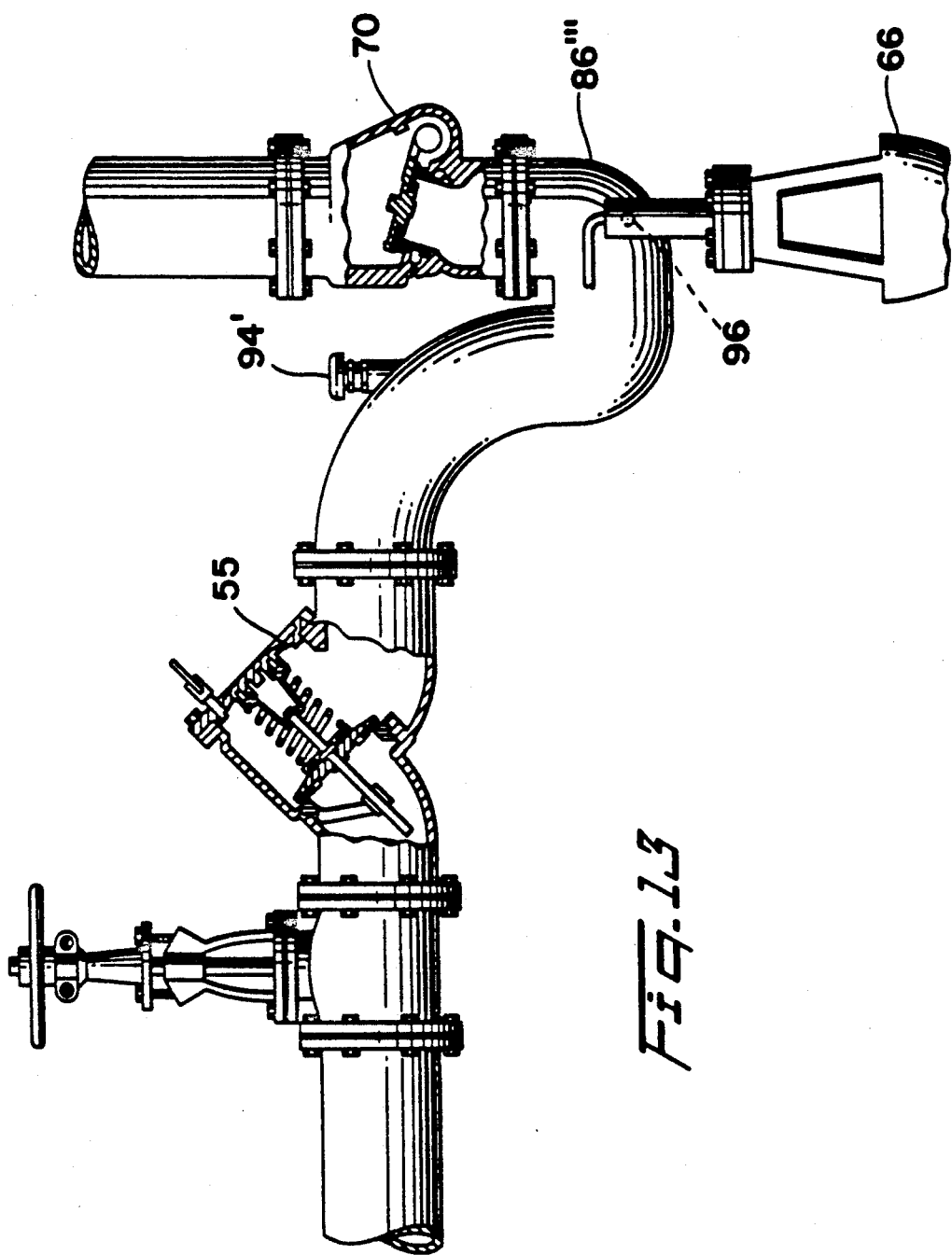

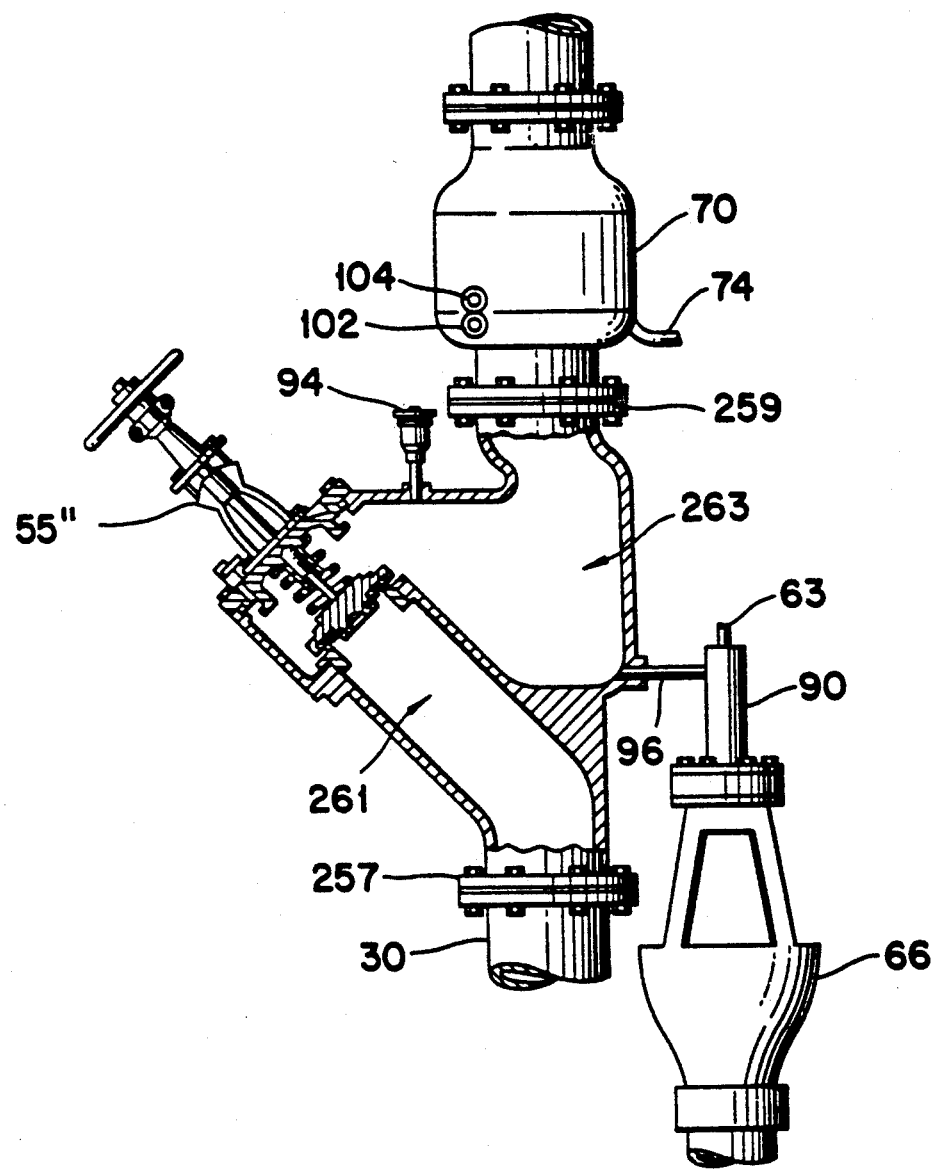

COMBINED ALARM AND BACK-FLOW PREVENTION ARRANGEMENT FOR FIRE SUPPRESSION SPRINKLER SYSTEM

CROSS REFERENCE TO RELATED APPLICATIONS

This application is a continuation-in-part of a patent application which was filed on Jul. 19, 1991, now U.S. Pat. No. 5,154,232, by George J. McHugh, entitled "COMBINED ALARM AND BACK-FLOW PREVENTION ARRANGEMENT FOR FIRE SUPPRESSION SPRINKLER SYSTEM", which has been assigned U.S. Ser. No. 733,203 and which is a continuation of a U.S. patent application which was filed on Aug. 23, 1990, by George J. McHugh, entitled "COMBINED ALARM AND BACK-FLOW PREVENTION ARRANGEMENT FOR FIRE SUPPRESSION SPRINKLER SYSTEM", which has been assigned U.S. Ser. No. 571,406, and is now abandoned, which is a continuation of a U.S. patent application which was filed on Apr. 10, 1989 and now issued as U.S. Pat. No. 4,991,655 by George J. McHugh, entitled "COMBINED ALARM AND BACKFLOW PREVENTION ARRANGEMENT FOR FIRE SUPPRESSION SPRINKLER SYSTEM", which has been assigned U.S. Ser. No. 335,381, and which is a continuation-in-part of a patent application which was filed on Nov. 10, 1988 and now abandoned by George J. McHugh, entitled "COMBINED ALARM AND BACKFLOW PREVENTION ARRANGEMENT FOR FIRE SUPPRESSION SPRINKLER SYSTEM", which has been assigned U.S. Ser. No. 269,314, and which is a continuation-in-part of a U.S. patent application which was filed on Sep. 29, 1988 and now abandoned by George J. McHugh, entitled "COMBINED ALARM AND BACKFLOW PREVENTION ARRANGEMENT FOR FIRE SUPPRESSION SPRINKLER SYSTEM", which has been assigned U.S. Ser. No. 250,834, and which is a continuation-in-part of a U.S. patent application which was filed on Sep. 21, 1988 and now abandoned by George J. McHugh, entitled "COMBINED ALARM AND BACK-FLOW PREVENTION ARRANGEMENT FOR FIRE SUPPRESSION SPRINKLER SYSTEM", which has been assigned U.S. Ser. No. 247,073.

BACKGROUND AND SUMMARY OF THE PRESENT INVENTION

The present invention relates generally to alarm valves and double check valve arrangements and more particularly relates to alarm valves and double check valve arrangements for use in fire suppression, water sprinkler systems.

A typical fire suppression water sprinkler system as installed in many buildings includes an array of individual fire sprinklers which are supplied with water through a main conduit and various branch conduits. The individual fire sprinklers are generally provided with a member that melts when the ambient temperature reaches a predetermined level indicative of a fire. The melting of the member opens the fire sprinkler to spray water in order to suppress the fire. The individual fire sprinklers are provided with meltable members so that the spray of water will hopefully be limited to the region of the building where the fire is present. In this way, the extent of water damage may be minimized.

Such fire suppression systems also oftentimes have one or more alarms that detects the flow of water through the main conduit and through branch conduits to indicate that a fire has started. The alarm typically triggers an audible signal to warn occupants of the building that a fire has started and may also send an appropriate signal directly to a fire department.

Especially in multi-floor sprinkler systems, a waterflow indicator alarm is typically provided for each floor or main branch of the main water supply conduit. The waterflow indicators generally include a member which extends into the passageway of the conduit. A flow of water, even from a single sprinkler is sufficient to move the member and trigger the alarm. Oftentimes, such waterflow indicator alarms are electrically connected to an audible alarm signal generator as well as to light panels to indicate the area in which the fire has occurred.

Another type of alarm is conventionally provided by an alarm valve that is provided in the main conduit. The alarm valve is constructed essentially as a check valve and includes a valve member or clapper that is normally held closed by static line pressure or by a spring such as when all of the individual sprinklers are closed. When one or more sprinklers opens, for example, due to a fire, the clapper provided in the alarm valve lifts off of its seat and an alarm is sounded.

Typically, when the clapper in the alarm valve lifts off of its seat, water under pressure is permitted to flow into a retarding chamber. The retarding chamber prevents false alarms due to surges or minor water pressure fluctuations. When the flow from the alarm valve into the retarding chamber is sufficient, the water drives a motor to sound an alarm. In addition, the flow of enough water into the retarding chamber may trigger an electrical alarm as a redundancy. The alarm may also be triggered electrically in response to a sensing of a flow of water through the valve (typically, a riser check valve) by a paddle switch. In this arrangement, the alarm is generally electrically operated rather than mechanically operated.

Fire suppression systems which include water sprinklers are oftentimes in fluid communication with the community water supply system or with whatever source of potable water is available in the vicinity. The water within the fire suppression system itself, however, can remain within the piping for a considerable period of time and is considered to be stagnant water. In addition, sometimes a pumper provided by the fire department will be connected to an inlet in communication with the fire suppression system in order to provide additional water and/or pressure in the event of a fire. The pumper may be in turn in communication with a source of non-potable water which could potentially enter the potable water supply in a backflow condition. Accordingly, it is desirable, and frequently required by ordinance that a backflow prevention device be provided between the arrangement of sprinklers and the water main conduit.

Most often, the backflow prevention is provided by a pair of spring loaded check valves that are located upstream of the alarm valve and at the connection of the fire suppression system to the potable water supply. Two check valves are required in order to provide an assurance that there will not be a backflow of stagnant water into the potable water supply. Frequently, the use of two check valves in the backflow prevention device is also required by ordinance.

In use, the two check valves are arranged so that both check valves are spring loaded in a closed configuration under normal pressure conditions. However, each check valve results in a pressure drop in the main conduit across the check valve. For example, if the main conduit has a supply pressure of 60 psi, there will be a pressure drop of perhaps 6 psi due to the first check valve. Accordingly, the pressure downstream of the first check valve may be 54 psi. The second check valve will also provide a pressure drop of perhaps 3 psi resulting in a pressure of 51 psi downstream of the second check valve. If all of the sprinklers remain closed and the supply pressure is maintained, the first and second check valves will remain closed.

If one or more of the sprinklers should open, the first and second check valves will both open to enable water to be supplied to the arrangement of sprinklers.

In the event that the supply pressure should drop below the pressure downstream of the second check valve, the first and second check valves are arranged to remain closed (or will close if they should happen to be open due to one or more of the sprinklers having opened). The second check valve will prevent the water in the piping downstream of the second check valve from flowing back through the second check valve. Likewise, the first check valve will provide a redundant protection against a backflow of the stagnant water into the main supply conduit.

Sometimes, however, one or both of the check valves may be fouled and remain open when they should be closed If at least one of the check valves should not be fouled and closes normally, a backflow of stagnant water into the potable water supply would be prevented.

In the event that both check valves should become fouled, however, the passageway between the first and second check valves can be provided with a hydraulically actuated relief valve and a vacuum breaker valve that together form a reduced pressure zone in the passageway. Under normal conditions, both the hydraulically actuated relief valve and the air/vacuum valve are closed. However, if both of the check valves should fail, the water which flows back through the second check valve is drained out of the system through the hydraulically actuated relief valve. This relief valve opens whenever the supply pressure (e.g. 60 psi) in the main conduit upstream of the first check valve is not sufficiently greater (typically about a 2 psi differential is required) than the pressure in the passageway between the two check valves.

The air/vacuum valve also opens whenever there is zero water pressure or a negative water pressure (i.e. the water is being urged for example by gravity or by a vacuum upstream of the two check valves or by water downstream of the two check valves to flow in a direction opposite to the normal flow direction) in the passageway between the two check valves. In this way, air is permitted to enter the main conduit through the first check valve and a siphonage of stagnant water is prevented.

To provide a separate alarm valve and a pair of check valves as a backflow prevention device typically requires that three separate check valves and three associated OS&Y gate valves (one on each side of the first two check valves and one upstream of the alarm valve or "third check valve" which is oftentimes remote from the first two check valves) be provided in the main water supply conduit. In the present invention, the need for two of the OS&Y gate valves and one of the check valves is eliminated. The two OS&Y gate valves can be eliminated because according to the present invention, one OS&Y gate valve performs the task of isolating the backflow preventer for testing and also the task of isolating the alarm valve and downstream system for service and resetting, if necessary. The OS&Y valve downstream of the backflow preventer is used only to create a static condition for testing and can be eliminated in the arrangement of the present invention because a water sprinkler system (i.e., the alarm valve and the closed system provided by the arrangement of sprinkler valves and associated piping) is static in its normal mode.

The use of three OS&Y gate valves and three check valves involves the expenditure of considerable time and expense during the installation of such plumbing. In addition, the use of three separate check valves results in a supply pressure which has been significantly decreased due to the pressure drop which occurs across each check valve. As a result the flow of water to the arrangement of water sprinklers may be inadequate, or a costly supplemental pumping arrangement may be required to supply all of the sprinklers needed for the fire suppression system, or a compensating increase in pipe size may be required to accommodate the reduced flow caused by the extra check valve.

In addition, it is conventional to provide an arrangement for detecting the flow of water through the backflow preventer to detect leaks and to provide a detection point for unauthorized use of water such as in an illegal tap into the fire protection system. A typical, known arrangement is disclosed by the Watts Regulator Company of Andover, Mass. as the double detector reduced pressure check valve/backflow preventer (Series 909DDC). Such an arrangement, however, is itself costly to manufacture and to install and necessitates that the bypass piping be provided with backflow prevention in addition to the backflow prevention necessary for the main line of the fire protection system.

Accordingly, it is an object of the present invention to provide a combined alarm valve and backflow prevention check valve arrangement for a fire suppression water sprinkler system which overcomes the disadvantages of the prior art.

Yet another object of the present invention is to provide a combined alarm valve and backflow prevention arrangement which is efficient and economical by minimizing the number of check valves and OS&Y gate valves which are required in the system.

Another object of the present invention is to eliminate two OS&Y gate valves which are normally installed upstream and downstream of a standard design double check valve, reduced pressure zone, backflow prevention device to provide a static condition for testing the backflow prevention device.

Still another object of the present invention is to provide a combined alarm valve and backflow prevention arrangement for a fire suppression system which minimizes the total pressure drop in the system due to the use of check valves.

Yet still another object of the present invention is to provide a plumbing fitting which is adapted to connect a check valve and an alarm valve together so as to provide a combined alarm valve and backflow prevention arrangement which overcomes the disadvantages of the prior art.

Still another object of the present invention is to provide an arrangement for detecting leaks and possibly illegal use of water in a backflow preventer which overcomes the disadvantages of the prior art.

Still yet another object of the present invention is to provide a combined alarm and backflow prevention arrangement having bypass meter piping which maintains the integrity of the backflow prevention arrangement and which overcomes the disadvantages of the prior art.

Yet another object of the present invention is to provide a backflow prevention and flow detection arrangement having bypass meter piping for recording a flow through the main conduit with an inlet of the bypass meter piping being provided in fluid communication with the main conduit between the first and second check valves and which overcomes the disadvantages of the prior art.

These and other objects are accomplished by a combined alarm valve and backflow prevention arrangement for a fire suppression sprinkler system, having a main conduit and an arrangement of individual sprinklers downstream of the main conduit. The combined alarm valve and backflow prevention arrangement includes a first check valve which is provided in the main conduit upstream of the arrangement of individual sprinklers and an alarm valve formed by a second check valve which is provided in the main conduit downstream of the first check valve and upstream of the arrangement of individual sprinklers. An alarm is provided to indicate when the alarm valve is open. Fluid communication is provided between the first check valve and the alarm valve and, in a preferred embodiment, a relief valve is arranged to provide a drain in response to the hydraulic pressure in the main conduit of the fire suppression system. The alarm valve and backflow prevention arrangement includes only two check valves which are provided in the main conduit.

In another preferred embodiment of the present invention, a plumbing fitting for use in a fire suppression system is provided to connect a check valve and an alarm valve to one another to provide a double check valve backflow preventer and an alarm valve arrangement. The plumbing fitting includes a conduit adapted to couple the plumbing fitting to the check valve upstream of the plumbing fitting and to couple the plumbing fitting to the alarm valve downstream of the plumbing fitting. A drain is provided for draining the plumbing fitting in response to the hydraulic pressure in the main conduit of the fire suppression system.

In another preferred embodiment of the present invention, a combined alarm valve and backflow prevention arrangement for a fire suppression, water sprinkler system, having a main conduit and an arrangement of individual water sprinklers downstream of the main conduit, includes a first check valve provided in the main conduit upstream of the arrangement of individual sprinklers. An alarm valve including a second check valve is provided in the main conduit downstream of the first check valve and upstream of the arrangement of individual sprinklers. An alarm is provided to indicate when the alarm valve is open. A passageway provides fluid communication between the first check valve and the alarm valve with a valve providing communication between the passageway and the atmosphere when the hydraulic pressure in the passageway falls or becomes zero or negative or falls below a first predetermined amount. A relief valve is provided for draining the passageway in response to the hydraulic pressure in the main conduit of the fire suppression system.

Further preferred embodiments of the present invention employ either a single straight-way stop-check valve or a single angle stop-check valve with the hydraulically actuated relief valve to further reduce the number of parts which are necessary.

In another preferred embodiment of the present invention a backflow preventer is provided with an impeller flow sensor or another flow detector to detect leaks and possible unauthorized use of water without the need for bypass piping and an additional backflow preventer for the bypass piping.

In another preferred embodiment of the present invention, a combined alarm and backflow prevention arrangement for a fire suppression sprinkler system has a main conduit and an arrangement of individual sprinklers downstream of the main conduit. The combined alarm and backflow prevention arrangement includes a first check valve which is provided in the main conduit upstream of the arrangement of individual sprinklers and an alarm valve formed by a second check valve which is provided in the main conduit downstream of the first check valve and upstream of the arrangement of individual sprinklers. An alarm is provided to indicate when the alarm valve is open. Fluid communication is provided between the first check valve and the alarm valve. The alarm valve and backflow prevention arrangement includes only two check valves which are provided in the main conduit. The arrangement also includes bypass meter piping for recording a flow through the main conduit. The bypass meter piping has a check valve for maintaining the integrity of the backflow prevention arrangement. Preferably, an inlet of the bypass meter piping in fluid communication with the main conduit downstream of the first check valve and upstream of the second check valve. Preferably, an outlet of the bypass meter piping is in fluid communication with the main conduit downstream of the second check valve.

In another preferred embodiment of the present invention, a backflow prevention and flow detection arrangement includes a first check valve provided in a main conduit. A second check valve is provided in the main conduit downstream of the first check valve with the first and second check valves together providing a double-check valve, backflow prevention device. A passageway provides fluid communication between the first check valve and the second check valve. Bypass meter piping is provided to record a flow through the main conduit with the bypass meter piping having a check valve for maintaining the integrity of the backflow prevention arrangement. Preferably, an inlet of the bypass meter piping is in fluid communication with the main conduit between the first and second check valves.

BRIEF DESCRIPTION OF THE DRAWINGS

Preferred embodiments of the present invention will be described in greater detail with reference to the accompanying drawings, wherein like members bear like reference numerals and wherein:

FIG. 4 is a top view in partial cross-section of the combined alarm valve and backflow prevention arrangement of FIG. 3;

FIG. 5 is a right side view of the combined alarm valve and backflow prevention arrangement of FIG. 3;

FIG. 6 is a side view of another preferred embodiment of the combined alarm valve and backflow prevention arrangement according to the present invention with the first check valve and the alarm valve shown in partial cut away;

FIG. 7 is a side view of another preferred embodiment of the combined alarm valve and backflow prevention arrangement which uses an angle valve, spring loaded closed;

FIG. 8 is a side view of yet another preferred embodiment of the combined alarm valve and backflow prevention arrangement which uses a stop-check valve, spring loaded closed;

FIG. 9 is a side view in partial cross-section of another preferred embodiment of the present invention;

FIG. 10 is a side view of another preferred embodiment of the present invention;

FIG. 13 is a side view in partial cross-section of another preferred embodiment of the present invention;

FIG. 14 is a side view in partial cross-section of another preferred embodiment of the present invention;

DETAILED DESCRIPTION OF THE PREFERRED EMBODIMENTS

Figure 1:
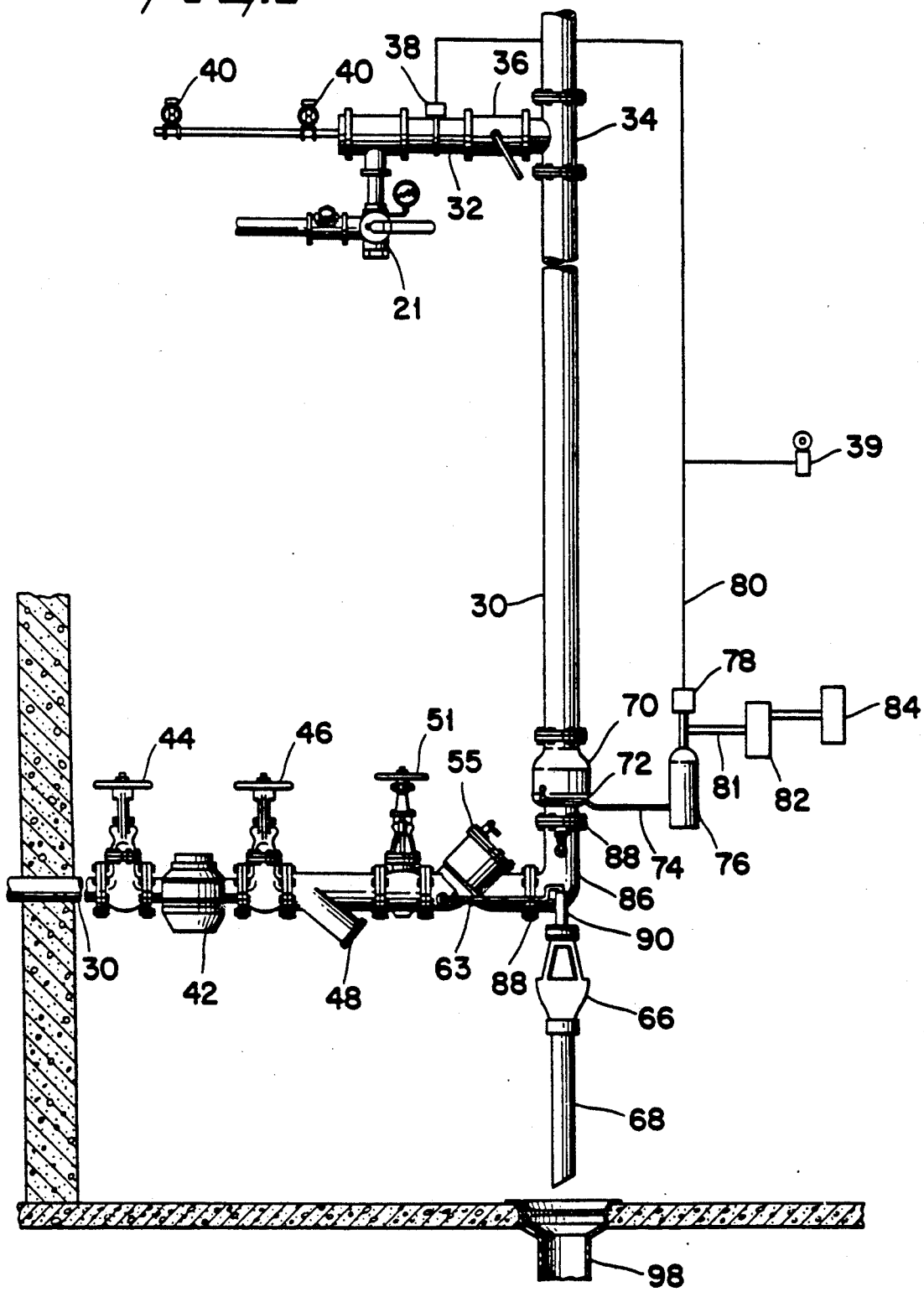
FIG. 1 is a front view of a combined alarm valve and backflow prevention arrangement in a fire suppression water sprinkler system according to the present invention.

With reference to FIG. 1, an arrangement for testing and draining a fire suppression water sprinkler system includes a main conduit 30 for supplying water. The conduit 30 supplies a branch conduit 32 by way of a Tee fitting 34. A branch valve 36 is provided for each branch conduit 32 with the branch valve 36 operable to permit or to interrupt the flow of water through the branch conduit 32.

Downstream of the branch valve 36 is provided a water flow switch 38. The water flow switch 38 is of suitable, conventional design and typically includes a paddle or other member (not shown) which extends into the branch conduit 32 The paddle is connected to a switch which is closed when the flow of water through the branch conduit is sufficient to move the paddle a predetermined amount. Closure of the switch provides an electrical signal which may be used to trigger a fire alarm 39 or to alert a fire department.

Downstream of the water flow switch, preferably another Tee fitting is provided with a test and drainage valve 21 provided in communication with the branch conduit as shown and described in more detail in U.S. Pat. No. 4,741,361 of McHugh. The test and drainage valve 21 is arranged so as to communicate with a drain (not shown) as desired.

As is conventional in the art, the individual fire sprinklers 40 are provided with a member that melts when the ambient temperature reaches a predetermined level indicative of a fire. Upon melting, the member opens the fire sprinkler to spray water to suppress the fire.

Upstream of the first Tee fitting 34, a water meter 42 is typically provided adjacent to the location where the main conduit 30 enters the premises. The water meter is provided between a first outside stem and yoke (OS&Y) gate valve 44 and a second OS&Y gate valve 46. Immediately adjacent to the second gate valve 46 is a strainer 48 which may be provided if desired.

Figure 2:
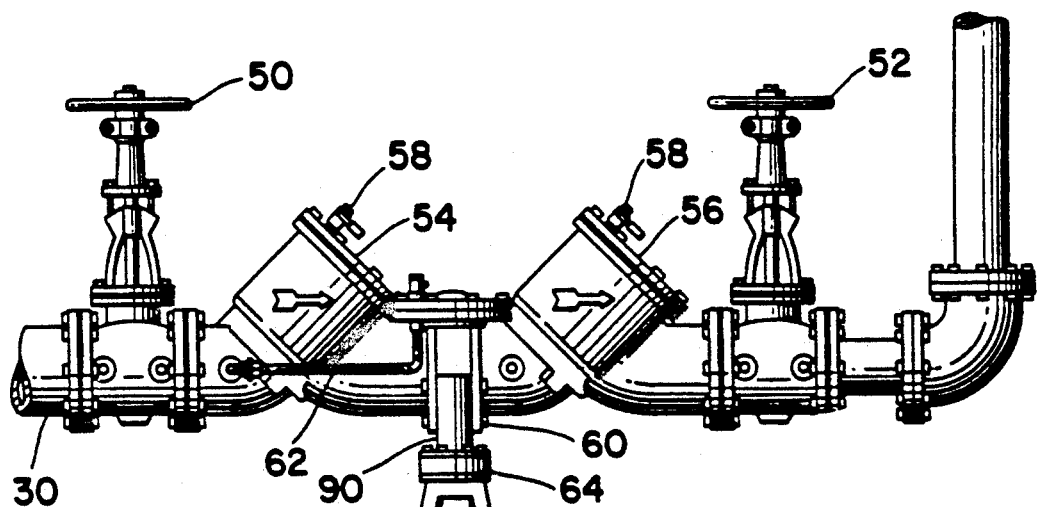
FIG. 2 is a double check valve, backflow preventer according to the prior art.

With reference now to FIG. 2, it is conventional in the prior art to provide a double check valve/backflow preventer in the main conduit 30. A typical backflow preventer is provided by Watts Regulator of Lawrence, Mass., as Model No. 909. Another suitable, conventional backflow preventer was provided by Lawler Backflow Preventer Department, Fluid Handling Division of ITT of Chicago, Ill. under various model numbers such as the RZ (reduced zone-double check) series. The Lawler backflow preventers generally have a bottom tapping for the hydraulic relief valve on the check valve (not shown).

Such a backflow preventer is generally provided between third and fourth OS&Y gate valves 50, 52. Between the third and fourth OS&Y gate valves 50, 52 are first and second check valves 54, 56. Each of the check valves 54, 56 is spring loaded and includes a test cock 58.

The first and second check valves are connected by a plumbing fitting 60 which provides a passageway between the two check valves. The plumbing fitting 60 includes a hydraulically actuated relief valve 90 which is normally maintained in a closed configuration by a line 62 which is in fluid communication with the main conduit upstream of the first check valve 54. In the event that the pressure within the main conduit 30 upstream of the first check valve 54 drops below the pressure in the passageway between the first and the second check valves 54, 56 the relief valve will open to drain the passageway through a port 64. The port 64 is provided above an air gap fitting 66 which drains into a pipe 68.

With reference again to FIG. 1, the arrangement according to the present invention includes an OS&Y gate valve 51 and the first check valve 55. The arrangement also includes a suitable, conventional alarm valve 70 such as is available from the Viking Corporation of Hastings, Mich.

The alarm valve 70 includes a check valve (see alarm valve 70' of FIG. 6) which is formed by a clapper 110 which is received by a seat 112 of the alarm valve 70. Preferably, the clapper 110 is spring loaded (not shown) since local ordinances typically require that the backflow preventer include two spring loaded check valves. The clapper 110 is normally closed and can be closed by a backflow of water in the main conduit 30 through the alarm valve but will open to permit a flow of water downstream as required by the individual sprinklers 40.

With reference again to FIG. 1, in the alarm valve 70, an alarm port 72 (see also FIG. 2) is opened when the clapper in the alarm valve opens. The alarm port 72 is connected by a line 74 to a retarding chamber 76. The retarding chamber prevents false alarms which may be otherwise caused by surges and pressure fluctuations. When the flow of water into the retarding chamber is sufficient, a pressure switch 78 is closed and an electrical signal is supplied to the fire alarm 39 through a wire 80. In addition, the water from the retarding chamber is supplied by a conduit 81 to drive a water motor 82. The water motor in turn drives a mechanical alarm 84 as a redundancy in the event of a loss of electrical power.

Figure 15:
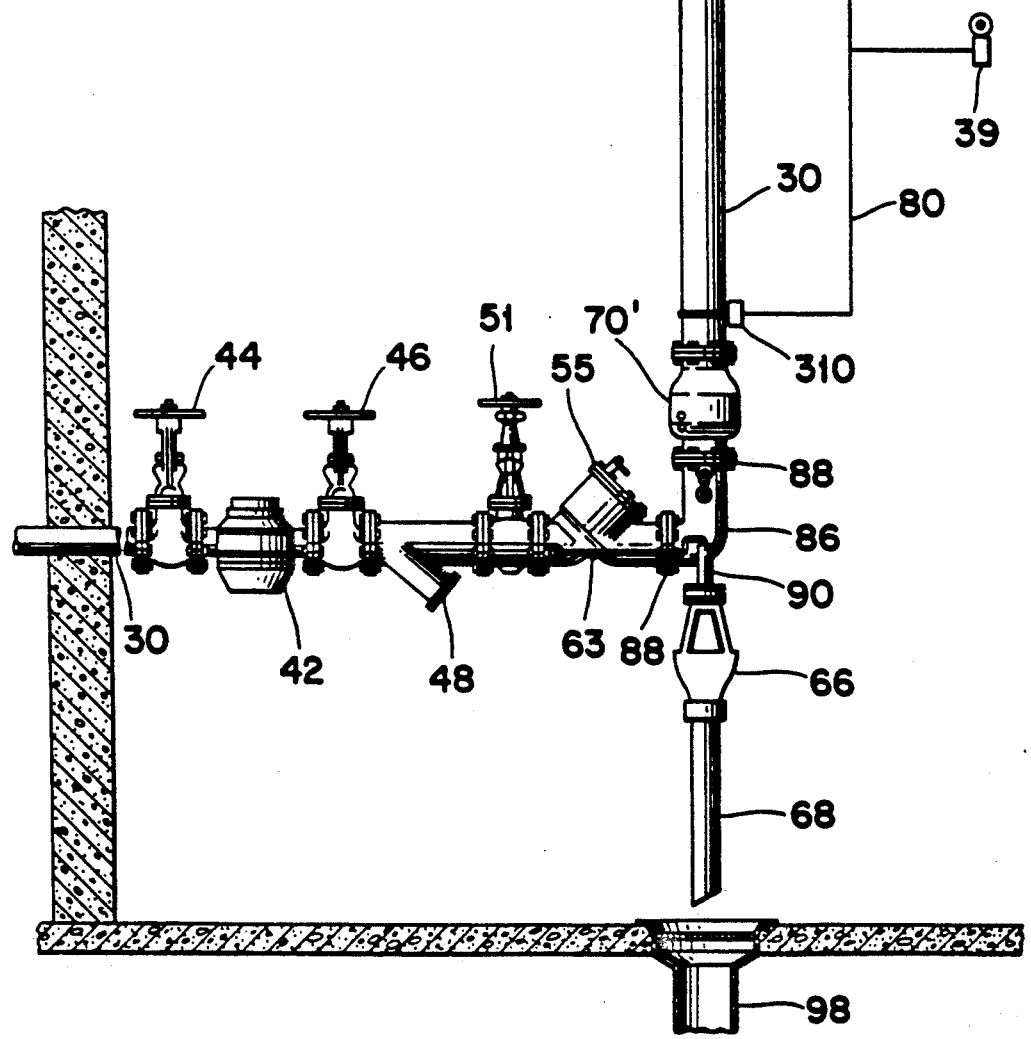
FIG. 15 is a front view of another embodiment of the combined alarm valve and backflow prevention arrangement in a fire suppression water sprinkler system according to the present invention.

Alternatively, the alarm valve 70 may be replaced by a swing check valve for riser pipe application 70' (see FIG. 15), which can be configured to accept a main drain valve and also can be tapped on each side of the clapper for the inclusion of pressure gauge and test valve piping. If this style of riser check valve is substituted for a standard alarm valve, an electric alarm flow switch 310 is installed downstream of the riser check valve and is electrically connected to the alarm 39.

Unless indicated otherwise, an alarm valve according to the present invention may include, but is not limited to, an alarm valve which hydraulically drives a mechanical alarm when triggered and also may include a swing check valve for riser pipe application together with the appropriate flow switch arrangement to electrically actuate an alarm.

With reference again to FIG. 1, the alarm port 72 may preferably be releasably sealed by an auxiliary valve (not shown) which is spring loaded. The auxiliary valve further prevents a false alarm due to pressure surges.

A plumbing fitting 86 is provided to connect the first check valve 55 with the alarm valve 70. The plumbing fitting 86 may have flanges 88 at each end so as to facilitate connection with matching flanges on the first check valve 55 and the alarm valve 70. Other coupling arrangements, such as the use of threaded couplings may be provided in the plumbing fitting 86 (and the other fittings as well) as desired and as will be readily appreciated by one skilled in the art of pipe-fitting. In addition, the various fittings can be connected by other suitable, conventional arrangements such as by clamp and groove couplings, etc.

In the preferred embodiment of FIG. 1, the plumbing fitting 86 has the flanges 88 oriented at 90 degrees with respect to one another. Such an arrangement enables the first check valve to be oriented horizontally and enables the alarm valve (the second check valve) to be oriented vertically. If desired, the plumbing fitting 86 could have the flanges 88 arranged linearly or at another angle to one another.

The right angle configuration is preferred for the plumbing fitting, however, as described below, since such an arrangement facilitates the proper orientation of a hydraulically actuated relief valve 90 with respect to the first check valve 55.

Figure 3:
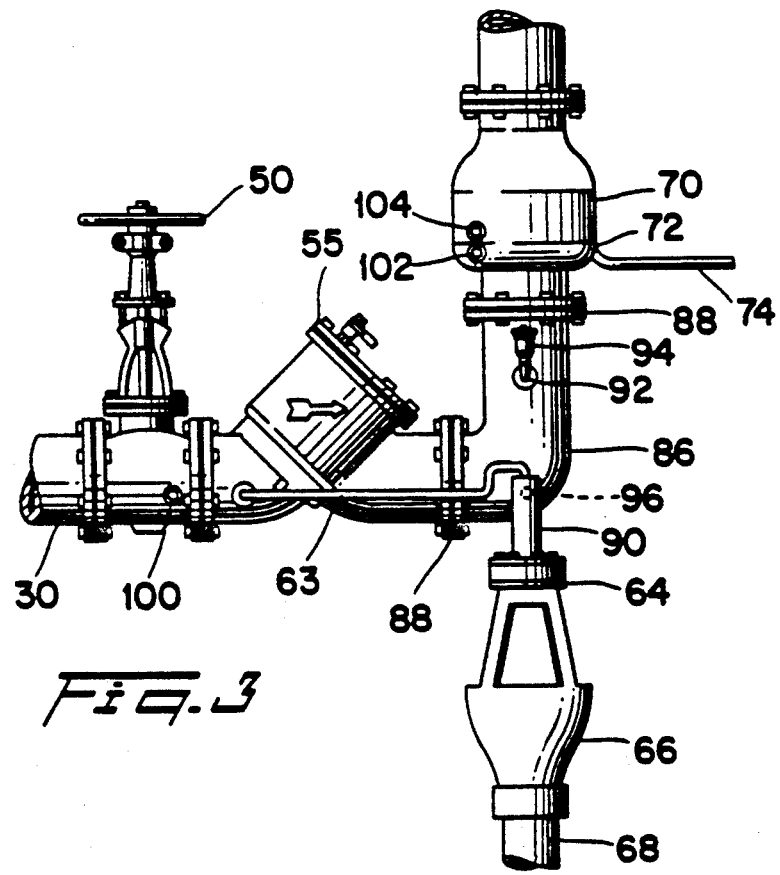
FIG. 3 is a front view of the combined alarm valve and backflow prevention arrangement of FIG. 1.

With reference to FIG. 3, the plumbing fitting 86 includes a port 92 which is adapted to receive an air/vacuum valve 94 such as is available from the Empire Specialty Co., Inc., of Mars, Pa. Another suitable vacuum relief valve is provided by Watts Regulator of Lawrence, Mass. (see the air/vacuum valve 94' of FIG. 13). The air/vacuum valve is normally closed when the passageway provided by the plumbing fitting 86 is pressurized. When the passageway is not pressurized, the air/vacuum valve 94 provides communication between the atmosphere and the passageway to prevent a siphoning action in the main conduit 30 through the first check valve as described below. Of course, depending upon the applicable regulations and the particular preferences of the fire protection system purchaser and installer, it may be desirable to eliminate the hydraulically actuated relief valve and/or the air vacuum valve.

The plumbing fitting 86 is also provided with a port 96 which is adapted to receive a suitable, conventional hydraulically actuated relief valve 90. The hydraulically actuated relief valve is in communication with the main conduit 30 through the line 63. When the pressure in the main conduit 30 upstream of the first check valve 55 is greater than the pressure in the passageway of the plumbing fitting 86, the hydraulically actuated relief valve is closed. When the pressure in the main conduit 30 upstream of the first check valve 55 is less than the pressure in the passageway of the plumbing fitting 86, the hydraulically actuated relief valve is open.

When the relief valve 90 is open, the passageway in the plumbing fitting 86 is in communication with the port 64 that drains into the air gap fitting 66. The air gap fitting 66 conducts the water into a pipe 68 to a drain 98 (see FIG. 1). The port 96 in the plumbing fitting 86 is preferably vertically lower than the lowermost edge of the seat of the first check valve 55 (see FIG. 6). In this way, a backflow of water from the main conduit 30 through the alarm valve will drain out of the relief valve rather than flow though the first check valve (which may be fouled). The sizing of the relief valve is typically designated by ordinance, and preferably conforms to ASSE (American Society of Sanitary Engineering) Standard No. 1013.

It is conventional to provide an OS&Y valve downstream of the second check valve in a double check valve backflow prevention device in order to facilitate a routine testing of the device. In the present invention, however, the need for such a valve is not present (unless required by local ordinance) since the sprinkler system provides a static condition downstream of the alarm valve (the second check valve in the double check valve backflow prevention device). Moreover, local ordinances may preclude the placement of a shut-off valve immediately downstream of the alarm valve. The elimination of the additional OS&Y valve downstream of the second check valve results in a considerable economic savings in itself as compared with the known prior art.

By adding a bypass piping from a location upstream of the first check valve 55 to a location downstream of the first check valve 55, a meter detector check valve can be added to control wastage or theft of water in a manner that is conventional in the art of check valve backflow preventers.

With reference again to FIG. 3, the OS&Y gate valve 50 is preferably provided with a test port 100 adjacent to the first check valve 55. The alarm valve 70 is likewise provided with a first test port 102 upstream of the clapper of the check valve and a second test port 104 downstream of the clapper. The test ports and test cocks of the OS&Y valve 50, the first check valve and the alarm valve are used during installation and periodic testing of the fire suppression system in a manner which is conventional in the art for double check valve backflow prevention devices.

With reference to FIG. 6, in another preferred arrangement of the combined alarm valve and back flow prevention arrangement for a fire suppression, water sprinkler system, according to the present invention, the first check valve 55' and the alarm valve 70' are provided in a common housing 106. The housing 106 eliminates the need for a separate plumbing fitting to connect the alarm valve and the first check valve together and likewise eliminates the need for the associated flanges or threaded openings. Such an arrangement reduces the installation cost of such a system by eliminating the time needed for connecting the alarm valve to a plumbing fitting and for connecting the first check valve to the plumbing fitting.

Turning now to FIG. 7, a further preferred modification of the present invention is illustrated. In FIG. 7, all reference numerals in common with those of FIG. 3 refer to identical elements. Accordingly, those common elements will not be described again at this time. An angle Y-pattern stop-check valve 150 (preferably an OS&Y valve as shown in the drawing) which is spring loaded to close is used in place of both the gate valve 50 and spring-loaded check valve 55 of FIG. 3. Such an angle stop-check valve 150 is preferably rated for 175 lb. or higher water service and is provided with a soft seat to give more positive shut-off characteristics than metal seats. The valve 150 can be made by modification of a standard 250 lb. iron stop-check valve of the type available from Crane Co., Park Ave., New York, N.Y. Necessary modifications of such a standard valve are (i) provision of a soft seat and (ii) provision of a spring for closure bias. The combination of the angle stop-check valve 150 with the alarm valve 70 and the fitting 86 provides a double check valve back flow preventer.

Where the combination is also provided with the line 63 connected between the upstream side of the check valve element in the stop-check valve 150 and the hydraulically actuated relief valve 90, as well as the port 64 and the associated air gap fitting 66, the assembly becomes a reduced pressure zone back flow preventer.

Yet another preferred embodiment is illustrated in FIG. 8. Here a straight-way Y-pattern stop-check valve 160 (again, preferably an OS&Y valve) is used in place of the angle stopcheck valve 150 of FIG. 7. In FIG. 8, all reference numerals in common with those of FIG. 3 refer to identical elements. Accordingly, those common elements will not be described again with respect of FIG. 8. The straight-way Y-pattern stop-check valve 160 is also spring loaded to close and is used in place of both the gate valve 50 and spring-loaded check valve 55 of FIG. 3. Such a straight-way Y-pattern stopcheck valve 160 is preferably rated for 175 lb. or higher water service and includes a soft seat to give more positive shut-off characteristics. The valve 160 can be made by modifying a standard 250 lb. iron stop-check valve of the type available from Crane Co., Park Ave., New York, N.Y. Necessary modifications include (i) providing a soft seat, and (ii) providing a spring for closure bias.

As with the assembly of FIG. 7, the combination shown in FIG. 8 of the straight-way stop-check valve 160 with the alarm valve 70 and the fitting 86 provides a double check valve back flow preventer.

Where the combination of FIG. 8 is further provided with the line 63 connected between the upstream side of the check valve element in the stop-check valve 160 and the hydraulically actuated relief valve 90, as well as the port 64 and the associated air gap fitting 66, this assembly also becomes a reduced pressure zone back flow preventer.

It will, of course, be appreciated by those skilled in the art that the stop-check valves 150, 160, of FIG. 7 and FIG. 8, respectively, can be of the Y-pattern, the globe pattern, the angle pattern or any other suitable conventional configuration. It is, however, important that the valves be spring-loaded to close.

In the preferred embodiments of FIGS. 1–6, the first check valve is oriented horizontally because the particular type of check valve which is illustrated in the figures is intended to be oriented horizontally when in use. Of course, the main conduit 30 for supplying water could be oriented vertically and the first check valve 55 oriented horizontally through the use of an elbow as is conventional in the art of backflow preventers. The need for an elbow is eliminated if the first check valve includes coupling flanges which are oriented at 90° to one another as shown, for example, in FIG. 7.

With reference now to FIG. 9, another preferred embodiment of the present invention is disclosed wherein the first check valve 55 and the plumbing fitting 86 are combined with one another integrally into a common housing 255. The housing 255 includes a coupling flange 257 to facilitate coupling of the housing 255 with the upstream gate valve 51. The coupling flange 257 is oriented linearly with a coupling flange 259 which is provided on the other end of the housing 255. In this way, the alarm valve 70 may be oriented directly vertically above the main water supply conduit 30 through the gate valve 51.

In the housing 255, an interior passageway through the housing includes a generally upwardly oriented, first portion 261 which is provided at an angle with respect to the vertical. The first check valve 55' is provided at the end of the first portion 261 of the interior passageway and serves the function which has been described in connection with the first check valve 55 of the embodiment of FIG. 1.

A second portion 263 of the interior passageway is oriented generally downwardly and then upwardly to the second flange coupling 259. In this way, the port 96 may be provided in the second portion of the interior passageway vertically lower than the lowermost portion of the first check valve 55' and the air/vacuum valve 94 may be connected through the conduit 92 above the first check valve 55' so as to provide communication between the atmosphere and the second portion of the interior passageway to prevent a siphoning action in the main conduit 30 through the first check valve 55.

With reference now to FIG. 10, it may be desirable to orient the alarm valve 70 horizontally, in-line with the first check valve 55. In such an arrangement, the plumbing fitting 86' includes a dip or depressed portion so that the port 96 is vertically lower than the lowermost portion of the seat of the first check valve 55.

Figure 11:
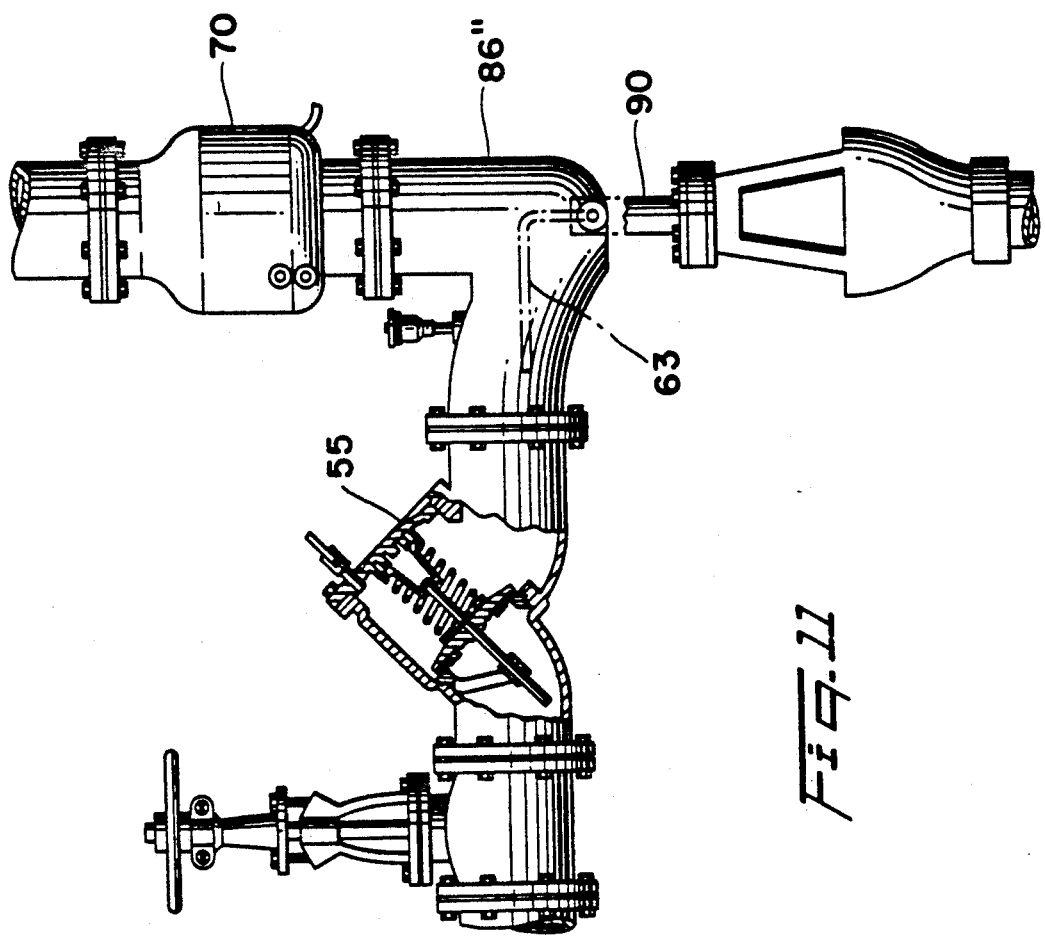
FIG. 11 is a side view in partial cross-section of another preferred embodiment of the present invention.

With reference to FIG. 11, the plumbing fitting 86" is provided with an exaggerated elbow so that the port 96 may be clearly located vertically lower than the lowermost portion of the seat of the first check valve 55. In the embodiment of FIG. 11, however, the second check valve 70 is located vertically higher than the first check valve 55.

With reference to FIG. 13, the plumbing fitting 86''' may be provided with a greatly exaggerated elbow so that the second check valve (the alarm valve 70) is oriented substantially below or at least at the same vertical elevation as the first check valve 55. Generally, it is preferable in double check valve backflow preventers to have the second check valve lower than the first check valve, or at least at the same height The port 96 is again located vertically lower than the lowermost portion of the seat of the first check valve 55.

Figure 12:
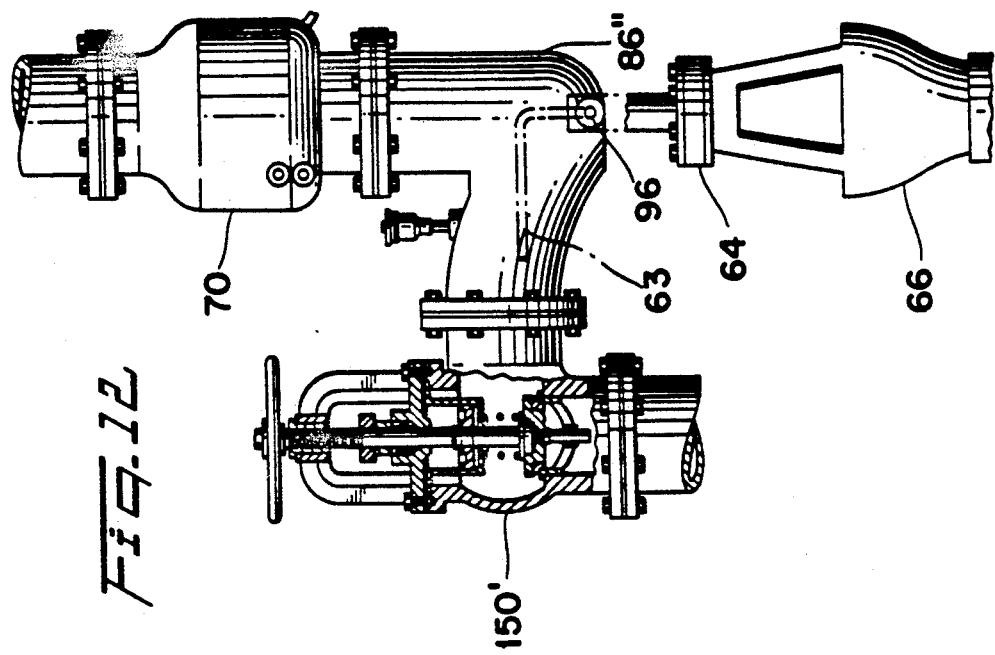
FIG. 12 is a side view in partial cross-section of another preferred embodiment of the present invention.

With reference to FIG. 12, the stop-check valve 150 of FIG. 7 may be replaced with an iron body auto stop check valve 150' (and preferably an OS&Y valve) so long as the valve check is spring biased closed. Preferably, in order to comply with local ordinances, the iron body auto stop check valve 150' is also arranged as an OS&Y valve by modifying the stem and handle in a manner which is readily apparent to one skilled in the art of stop check valves.

In the embodiment of FIG. 12, the plumbing fitting 86" (see FIG. 11) is preferably provided between the first check valve (the auto stop check valve 150') and the alarm valve 70. Since the plumbing fitting 86" is provided with an exaggerated elbow or dip, the port 96 may be clearly located vertically lower than the lowermost portion of the seat of the first check valve (the auto stop check valve 150').

With reference to FIG. 14, an arrangement which is similar to that of FIG. 9 replaces the first check valve 55' with a stop check valve 55". The stop check valve 55" is spring loaded to close and is used in place of both the gate valve 50 and the spring-loaded check valve 55 of FIG. 3.

The present invention has been described with reference to a conventional "wet-pipe" fire suppression, water sprinkler system. However, the present invention is likewise applicable to dry-pipe systems and to systems which may be filled with fluids other than water (such as glycerin or ethylene glycol or other poisonous substances) wherein it is desirable to provide a double check valve backflow preventer and an alarm valve to indicate that at least one sprinkler has opened.

In addition, other features may be provided for the system such as a flow detector or a double detector arrangement which allows the water utility to detect leaks or unauthorized use of water. For example, meter piping may be installed from upstream of the first check valve to downstream of the alarm valve to thereby provide the function of a "detector check" to indicate the use of water in the system.

Figure 16:
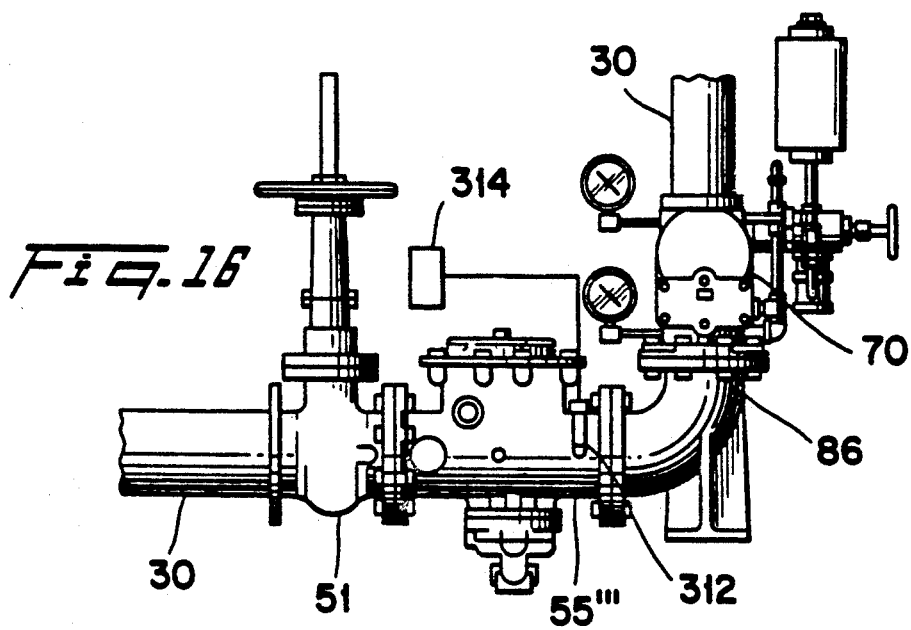
FIG. 16 is a side view of another preferred embodiment of the combined alarm valve and backflow prevention device according to the present invention including an improved flow detection arrangement according to the present invention.
Figure 17:
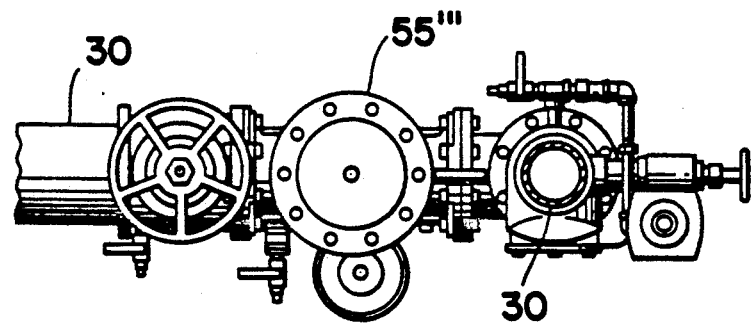
FIG. 17 is a top view of the arrangement of FIG. 16.
Figure 18:
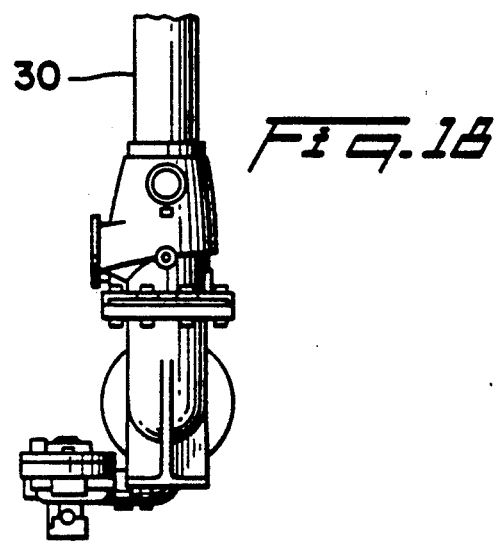
FIG. 18 is a side view of the arrangement of FIG. 16.

With reference now to FIG. 16, an alarm and backflow preventer according to the present invention is disclosed wherein the first check valve 55''' is provided with an impeller-type, flow sensor 312 such as is available from Data Industrial of Pocasset, Mass. The sensor 312 is provided integrally within the backflow preventer and is preferably provided integrally in the housing for the first check valves. The sensor 312 may alternatively be any suitable conventional flow sensor such as an ultrasonic sensor, a microswitch sensor or an optical sensor. In this arrangement, the conventional bypass piping and the accompanying additional backflow preventer for the bypass piping has been replaced by the flow sensor 312 in order to provide leakage detection and the detection of possible unauthorized use of water in the fire protection system.

The replacement of the bypass piping with the flow sensor 312 may be provided in a combined alarm valve and backflow preventer according to the present invention or may be provided in a conventional backflow preventer (such as double check valve or reduced pressure zone style) according to the prior art.

In the conventional arrangement, a water meter is also provided in order to measure the amount of water usage. The metering depends upon the differential in pressure drop across the bypass backflow prevention device being less than the pressure drop across the backflow prevention device for the main conduit. Since the resistance to water flow through the backflow preventer in the bypass piping is arranged to be less than the resistance to flow through the backflow preventer in the main conduit, the meter in the bypass piping will be able to record a leakage or an unauthorized flow of water in the fire protection system.

However, the bypass piping requires an excessive pressure drop across the backflow preventer for the main conduit which provides a major problem in fire protection systems in many areas of the country. For example, if the average pressure in a water line supplying a fire protection main conduit has a pressure of 50 psi, a loss of 10 psi due to the bypass piping arrangement reduces the available pressure by 20%.

In order to overcome this problem, the bypass piping and the associated bypass backflow prevention arrangement (with its need for a pressure differential with respect to the backflow preventer of the main conduit) is deleted and instead, a relatively highly sensitive impeller flow sensor or another alternative sensor as described above is provided in the first check valve. The impeller flow sensor would then rotate in response to any measurable flow through the first check valve. The flow sensor would be connected either mechanically or electrically to a flow monitor 314 that would be installed outside of the first check valve. The monitor could be linked either directly or through a transmitter to send a recording signal to a remote location. Upon flow through the first check valve, the sensor would cause the recorder to record the amount of flow through the conduit.

In operation of the combined alarm valve and backflow preventer, when the main conduit 30 is supplied with normal line pressure of perhaps 60 psi and the first check valve and the alarm valve are not fouled, the first check valve will be closed due to the spring bias and due to the pressure differential across the check valve. Typically, the pressure drop across the first check valve may be 6 psi depending upon the size of the system, the type of check valve and the upstream pressure in the main conduit. The check valve in the alarm valve 70 will also be closed due to the pressure drop across the check valve of perhaps 3-5 psi. Therefore, if the pressure in the passageway between the first check valve and the alarm value is 54 psi, the pressure downstream of the alarm valve will be about 50 psi.

In such a normal configuration, the hydraulically actuated relief valve will be closed and the air/vacuum valve which are provided in the passageway between the first check valve and the alarm valve will likewise be closed.

If one or more of the individual sprinklers should open, the first check valve and the alarm valve will open to supply water to the sprinklers. The flow of water through the alarm valve will also result in a flow of water to the retarding chamber which is sufficient to trigger an electrical alarm and to drive a water motor to sound a mechanical alarm.

If the pressure in the main conduit upstream of the first check valve should drop, the first check valve and the alarm valve should remain closed (or should close if they were initially open). The hydraulically actuated relief valve should open if the pressure in the main conduit falls below the pressure in the passageway between the first check valve and the alarm valve. Likewise, the air/vacuum valve should open if the pressure in the passageway should become zero or negative (or fall below some predetermined value).

If the first check valve should foul and fail to close, but the alarm valve closes properly, a backflow will be prevented by the alarm valve. Likewise, if the first check valve should close properly but the alarm valve should foul and fail to close, the backflow will be prevented by the first check valve.

In the event that both the first check valve and the alarm valve should foul and fail to close, the hydraulically actuated relief valve will open to allow the backflow from the main conduit downstream of the alarm valve to drain. In addition, the air/vacuum valve will open to allow air to flow into the main conduit through the first check valve to prevent a siphoning of stagnant water through the first check valve. In this way, a backflow of stagnant water into the main conduit upstream of the first check valve is completely prevented.

Figure 19:
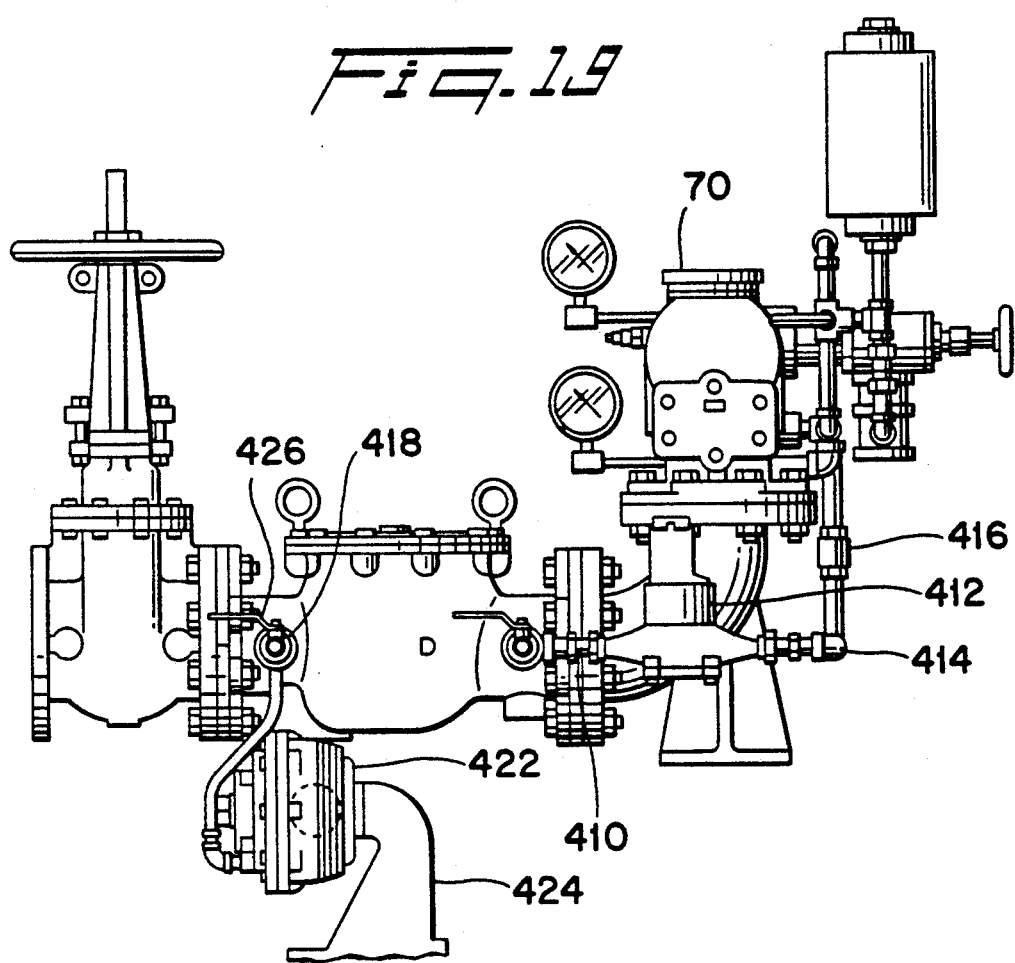
FIG. 19 is a side view of the arrangement of FIG. 16 including bypass piping.
Figure 20:
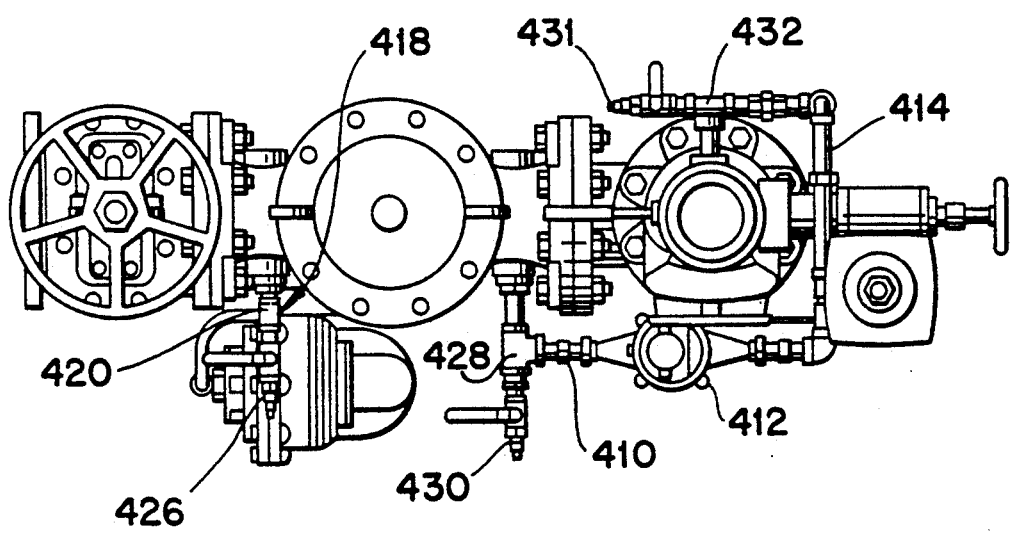
FIG. 20 is a top view of the arrangement of FIG. 19.

With reference now to FIG. 19, an alarm and backflow preventer according to the present invention corresponds generally to the arrangement described in connection with FIG. 16. However, the impeller-type flow sensor 312 is omitted and instead, bypass piping is provided from a location upstream of the second check valve 70 to a location downstream of the second check valve. The bypass piping includes a meter to control wastage or theft of water in the arrangement and also includes a check valve so as to maintain the integrity of the double check valve arrangement and prevent a backflow of water in the arrangement.

The water meter measures and records the amount of water usage. If desired, the meter may have a remote indication provided either through an electric mechanism of conventional design or any other arrangement for conveying the record of water usage from the meter to a remote location. The metering depends upon the differential in pressure drop across the bypass backflow prevention device being less than the pressure drop across the backflow prevention device for the main conduit (e.g., the second check valve). Since the resistance to water flow through the backflow preventer in the bypass piping is arranged to be less than the resistance to flow through the backflow preventer in the main conduit, the meter in the bypass piping will be able to record a leakage or an unauthorized flow of water in the fire protection system.

With reference now to FIG. 19, a passageway 410 is provided in communication with the backflow preventer downstream of the first check valve and upstream of the second check valve. The passageway 410 includes a bypass meter 412 which has a desired arrangement for recording the expected amount of flow through the bypass piping. The outlet of the bypass meter 412 is connected to a passageway 414 which includes a bypass check valve such as an in-line check valve 416. The outlet of the bypass check valve is connected to another passageway which is in fluid communication with the main conduit downstream of the second check valve.

The bypass check valve and the bypass meter together have a resistance to flow which is sufficiently less than the resistance to flow through the second check valve that any flow through the arrangement from upstream of the second check valve to downstream of the second check valve would first flow through the bypass meter piping arrangement.

With reference to the first check valve, a passageway 418 is provided in communication with the main conduit upstream of the first check valve. The passageway preferably includes a "Tee" fitting 420 with one of the openings of the "Tee" fitting being connected to the passageway 418. Another of the openings of the "Tee" fitting 420 is connected to a relief valve 422 (if desired) which is in turn connected to an air gap drain cup 424. The other opening in the "Tee" fitting 420 is connected to a first test cock 426.

Preferably, a "Tee" fitting 428 is also provided in the passageway 410 with a second test cock 430 provided on one of the openings in the "T" fitting 428. Another "Tee" fitting 432 is preferably provided in the passageway 414 downstream of the bypass check valve with a third test cock 431 then provided in fluid communication with the main conduit downstream of the second check valve through the "Tee" fitting 432. The first, second, and third test cocks may then be used as pressure gauge and test ports to test the operation of the backflow prevention arrangement.

The bypass meter piping arrangement also has utility in conventional double check valve backflow prevention arrangements (including reduced pressure zone backflow preventers). By providing the inlet for the bypass metering between the first check valve and the second check valve, the integrity of the double check valve arrangement in the bypass meter piping is maintained while only using one check valve in the bypass meter piping. Especially in reduced pressure zone arrangements, the location of the inlet for the bypass piping between the first and second check valves results in significant savings because there is no need for a separate reduced pressure zone arrangement in the bypass meter piping when since the inlet for the bypass meter piping is provided in the passageway between the first and second check valves in the main conduit.

While the combined alarm and backflow prevention arrangement according to the present invention has been described with reference to a fire suppression water sprinkler system, it is expected that the arrangement may be of general utility in systems other than water sprinkler systems. Accordingly, the principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

I claim:

1. A combined alarm and backflow prevention arrangement for a fire suppression sprinkler system, having a main conduit and an arrangement of individual sprinklers downstream of the main conduit, said combined alarm and backflow prevention arrangement comprising:

a first check valve provided in said main conduit upstream of said arrangement of individual sprinklers, said first check valve being spring based and having a valve member and a valve seat;

an alarm valve formed by a second check valve provided in said main conduit downstream of said first check valve and upstream of said arrangement of individual sprinklers, said second check valve being spring biased and said first and second check valves together providing a backflow prevention device;

alarm means for indicating when the second check valve is open;

means for providing fluid communication between said first check valve and said alarm valve through a passageway;

bypass meter piping means for recording a flow through the main conduit, said bypass meter piping means having a check valve means for maintaining the integrity of the backflow prevention arrangement;

whereby said alarm and backflow prevention arrangement includes only two check valves which are provided in said main conduit, said only two check valves being said first check valve and said second check valve.

2. The combined alarm and backflow prevention arrangement of claim 1 wherein an inlet of the bypass meter piping means is in fluid communication with the main conduit downstream of the first check valve and upstream of the second check valve and wherein an outlet of the bypass meter piping means is in fluid communication with the main conduit downstream of the second check valve.

3. The combined alarm and backflow prevention arrangement of claim 1 further comprising a test cock provided in fluid communication with the inlet of the bypass meter piping means and in fluid communication with the main conduit downstream of the first check valve and further comprising another test cock in fluid communication with the outlet of the bypass meter piping means.

4. The arrangement of claim 1 wherein the means for providing communication between said first check valve and said alarm valve comprises a plumbing fitting, said plumbing fitting comprising a conduit having means for coupling said plumbing fitting to the first check valve upstream of the plumbing fitting and means for coupling said plumbing fitting to the alarm valve downstream of the plumbing fitting.

5. The arrangement of claim 4 wherein the check valve means of the bypass meter piping includes only one check valve.

6. The arrangement of claim 1 further comprising means for admitting air into said main conduit upstream of said alarm valve when the pressure in said main conduit upstream of the alarm valve falls below a predetermined amount.

7. The arrangement of claim 1 wherein said alarm means includes a fluid driven motor alarm which is actuated by fluid supplied downstream of said second check valve, when said second check valve is open.

8. The arrangement of claim 1 wherein said alarm valve is provided with pressure gauge and test ports immediately upstream and downstream of the second check valve.

9. The arrangement of claim 8 wherein said second check valve is a swing check valve for rise pipe.

10. The arrangement of claim 7 wherein said pressure gauge and test port immediately upstream of the second check valve is provided in fluid communication with an inlet of the bypass meter piping means and wherein said pressure gauge and test port immediately downstream of the second check valve is provided in fluid communication with an outlet of the bypass meter piping means.

11. A combined alarm and backflow prevention arrangement having a main conduit, said combined alarm and backflow prevention arrangement comprising:

a first check valve provided in said main conduit;

an alarm valve formed by a second check valve provided in said main conduit downstream of said first check valve, said first and second check valves together providing a backflow prevention device;

alarm means for indicating when the second check valve is open;

means for providing fluid communication between said first check valve and said alarm valve through a passageway;

bypass meter piping means for recording a flow through the main conduit, said bypass meter piping means having a check valve means for maintaining the integrity of the backflow prevention arrangement, an inlet of the bypass meter piping means being in fluid communication with the main conduit downstream of the first check valve and upstream of the second check valve and an outlet of the bypass meter piping means being in fluid communication with the main conduit downstream of the second check valve;

whereby said alarm and backflow prevention arrangement includes only two check valves which are provided in said main conduit, said only two check valves being said first check valve and said second check valve and wherein said check valve means of said bypass meter piping means includes only one check valve.

12. The arrangement of claim 11 further comprising a test cock provided in fluid communication with the inlet of the bypass meter piping means and in fluid communication with the main conduit downstream of the first check valve and further comprising another test cock in fluid communication with the outlet of the bypass meter piping means.

13. The arrangement of claim 11 wherein the means for providing communication between said first check valve and said alarm test valve comprises a plumbing fitting, said plumbing fitting comprising a conduit having means for coupling said plumbing fitting to the first check valve upstream of the plumbing fitting and means for coupling said plumbing fitting to the alarm valve downstream of the plumbing fitting.

14. The arrangement of claim 13 wherein the first check valve is spring loaded.

15. The arrangement of claim 11 further comprising means for admitting air into said main conduit upstream of said alarm valve when the pressure in said main conduit upstream of the alarm valve falls below a predetermined amount.

16. The arrangement of claim 11 wherein said alarm means includes a fluid driven motor alarm which is actuated by fluid supplied downstream of said second check valve, when said second check valve is open.

17. The arrangement of claim 16 wherein said pressure gauge and test port immediately upstream of the second check valve is provided in fluid communication with an inlet of the bypass meter piping means and wherein said pressure gauge and test port immediately downstream of the second check valve is provided in fluid communication with an outlet of the bypass meter piping means.

18. The arrangement of claim 11 wherein said alarm valve is provided with pressure gauge and test ports immediately upstream and downstream of the second check valve.

19. The arrangement of claim 18 wherein said second check valve is a swing check vale for rise pipe.

* * * * *